J. W. ATKINSON.
SKY-LIGHT BARS.

No. 191,636. Patented June 5, 1877.

ATTEST:
O. H. Adix
Geo. G. Thomas

INVENTOR:
James W. Atkinson
By G. L. Chapin
Atty

UNITED STATES PATENT OFFICE.

JAMES W. ATKINSON, OF CHICAGO, ILLINOIS.

IMPROVEMENT IN SKYLIGHT-BARS.

Specification forming part of Letters Patent No. 191,636, dated June 5, 1877; application filed April 23, 1877.

*To all whom it may concern:*

Be it known that I, JAMES W. ATKINSON, of Chicago, county of Cook, and State of Illinois, have invented a new and useful Improvement in Skylight-Bars, of which the following is a specification:

The nature of the present invention consists in studs placed at suitable intervals, and interposed between an upper putty-trough and lower drip-trough, and secured to the drip-trough, and provided with bolts for clamping a cap-plate to the studs and to the putty-trough.

The object of the invention is to provide skylight-bars of suitable strength, in which there is an abundant circulation of air to prevent condensation on the drip-trough, and to secure the glass to the bars water-tight, as the whole is to be hereinafter described and shown.

Figure 1:
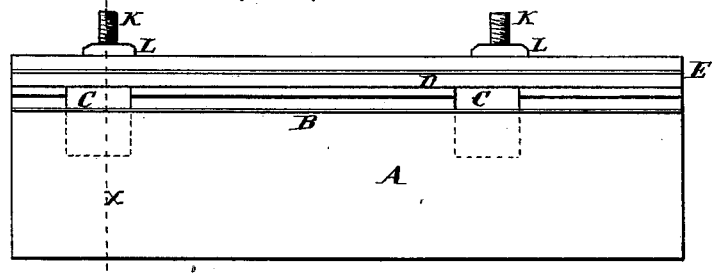
Figure 2:
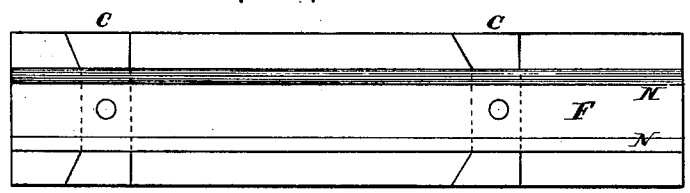
Figure 3:
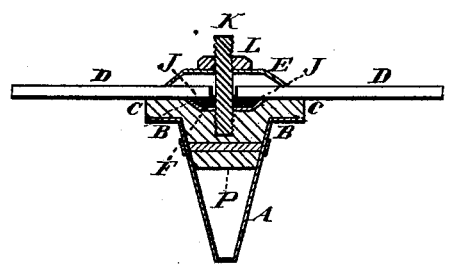

In the drawings, Figure 1 is a broken side view of my improved skylight bar; Fig. 2, a top view with glass cap-plate and bolt-fastening detached, to give a clear view of the supporting-studs and upper detached trough; Fig. 3, a section on line $x$, Fig. 1.

A represents the lower trough, which, at proper intervals for strength, is secured to studs P, provided with outwardly-projecting flanges C on either side, as an additional support for the glass D over the support it receives from the trough F.

These studs may be secured to trough A by bolts or solder, according to the material used. The trough A, where large glass is used, is turned out to form flanges B on the under side of flanges C on the studs P, to catch the large amount of condensed vapor; but where small glass is used the upper edges of the trough A may butt against the flanges C. The top sides of the studs are formed to receive the inclined sides of trough F, in which putty J J is placed to bed the glass D. Above the glass D is placed a cap-plate, E, whereby bolts K, fastening to studs P, and by nuts L, may clamp the glass down on the putty in trough F, and on the flanges C of the studs; and also bed the glass in the putty to be put above the glass D and under cap E, to form a perfect joint.

The trough F has no communication with trough A, as in other skylight-bars, but is detached, so as to allow air freely to pass between the two troughs, and prevent condensation on the under sides of the metal, as is the case as troughs are now constructed.

The bolts K may pass through the studs P, or screw into them, as desired.

I know that drip-troughs, in many forms, are known to the art for skylight-bars, and for this reason I confine myself to the construction shown.

I claim and desire to secure by Letters Patent—

The combination of the studs P with the troughs A F, the clamping-plate E, and nut and bolt fastening, as and for the purpose specified.

JAMES W. ATKINSON.

Witnesses:
O. H. ADIX,
GEO. G. THOMAS.